(12) United States Patent
Sugiyama

(10) Patent No.: US 11,330,141 B2
(45) Date of Patent: May 10, 2022

(54) IMAGE READER AND IMAGE READING METHOD WITH DATA MOVE FUNCTION

(71) Applicant: SHARP KABUSHIKI KAISHA, Sakai (JP)

(72) Inventor: Hiroki Sugiyama, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 16/933,909

(22) Filed: Jul. 20, 2020

(65) Prior Publication Data
US 2021/0029266 A1      Jan. 28, 2021

(30) Foreign Application Priority Data

Jul. 22, 2019   (JP) .............................. JP2019-134574

(51) Int. Cl.
*H04N 1/21*      (2006.01)
*H04N 1/00*      (2006.01)
*H04N 1/32*      (2006.01)

(52) U.S. Cl.
CPC ....... *H04N 1/2158* (2013.01); *H04N 1/00413* (2013.01); *H04N 1/32448* (2013.01); *H04N 1/32454* (2013.01)

(58) Field of Classification Search
CPC ............. H04N 1/2158; H04N 1/00413; H04N 1/32454; H04N 1/32448

USPC ............................................... 358/1.15, 1.16
See application file for complete search history.

(56) References Cited

U.S. PATENT DOCUMENTS

| 2006/0262351 | A1* | 11/2006 | Kim | H04N 1/2158 358/1.16 |
| 2008/0151299 | A1* | 6/2008 | Takahata | H04N 1/32678 358/1.15 |
| 2008/0204804 | A1* | 8/2008 | Yamada | H04N 1/32358 358/1.15 |
| 2011/0051193 | A1* | 3/2011 | Okabe | H04N 1/00204 358/1.16 |

FOREIGN PATENT DOCUMENTS

| JP | 2010-176367 A | 8/2010 |
| JP | 2010-178283 A | 8/2010 |

* cited by examiner

*Primary Examiner* — Kent Yip
(74) *Attorney, Agent, or Firm* — ScienBiziP, P.C.

(57) ABSTRACT

A universal serial bus (USB) memory that stores image data acquired by reading a document is connectable with an image reader. The image reader includes a storage capacity detector that detects storage capacity capable of storing information in the USB memory at a time point of reading a document, a capacity comparison section that compares size of the image data acquired by reading the document with the storage capacity of the USB memory, a data extractor that extracts the data to be moved to another storage medium from data that has already been stored in the USB memory, and a data mover that moves the data extracted by the data extractor to the other storage medium.

17 Claims, 11 Drawing Sheets

IMAGE READER AND IMAGE READING METHOD WITH DATA MOVE FUNCTION

BACKGROUND OF THE INVENTION

Field of the Invention

The present invention relates to an image reader and the like and, in particular, to an image reader and the like that store image data acquired by reading a document in an external recording medium. This Nonprovisional application claims priority under 35 U.S.C. § 119(a) on Patent Application No. 2019-134574 filed in Japan on 22 Jul. 2019, the entire contents of which are hereby incorporated by reference.

Description of the Background Art

In recent years, of multifunction peripherals functioning as image readers, a multifunction peripheral to which an external storage medium such as a universal serial bus (USB) memory is connected and which has a function of storing scan data in a file format such as a portable document format (PDF) in the external storage medium has been widespread, With such a function, even when a user is out, the user can use the multifunction peripheral installed in a public space such as a convenience store to easily store the scan data in the external storage medium.

However, in the case where a sufficient free space is unavailable in the external storage medium at the time of storing the scan data in the external storage medium, the scan data cannot be stored, which causes a problem of the generated scan data to be wasted.

To handle such a problem, as the related art, Japanese Unexamined Patent Application Publication No. 2010-176367 discloses a technique of assigning a password to the scan data and temporarily storing the scan data in a mass storage medium (a hard disk drive (HDD) or the like) mounted on the image reader in the case where the scan data cannot be stored in the external storage medium that is connected to the image reader due to the insufficient free space thereof.

In addition, Japanese Unexamined Patent Application Publication No. 2010-178283 discloses a technique of comparing scan data size that is predicted from a set image reading condition with the free space of the external storage medium connected to the image reader and urging to change the image reading condition such that the predicted scan data size does not exceed the free space of the external storage medium.

However, the technique disclosed in Japanese Unexamined Patent Application Publication No. 2010-176367 does not fulfill an original purpose of "storing the scan data in the external storage medium", and forces the user to perform a different task of acquiring the scan data that is temporarily stored in the mass storage medium (the HDD or the like) mounted on the image reader.

Meanwhile, the technique disclosed in Japanese Unexamined Patent Application Publication No. 2010-178283 contributes to a reduction in scan data size by relaxing the image reading condition (resolution or the like). However, the scan image quality desired by the user may not be satisfied. In addition, depending on a variation in the predicted scan data size, such a problem occurs that scanning may have to be redone.

The present invention has been made in view of the above conventional problems, and an object thereof is to provide an image reader and the like capable of storing image data that satisfies desired scan image quality by a user in an external storage medium that is attached to the image reader even in the case where size of the read image data is larger than a free space of the external storage medium.

SUMMARY OF THE INVENTION

The present invention is an image reader that reads a document, and an external storage medium that stores image data acquired by reading the document is connectable with an image reader. The image reader includes a storage capacity detector that detects storage capacity capable of storing information in the external storage medium at a time point of reading the document, a capacity comparison section that compares size of the image data acquired by reading the document with the storage capacity of the external storage medium, a data extractor that extracts data to be moved to another storage medium from data that has already been stored in the external storage medium, and a data mover that moves the data extracted by the data extractor to the other storage medium.

In addition, the present invention is an image reading method for an image reader that reads a document; and the image reading method includes reading the document, detecting storage capacity capable of storing information in an external storage medium that is connected to the image reader at the time of reading the document, comparing size of image data acquired by reading the document with the storage capacity of the external storage medium, extracting the data to be moved to another storage medium from data that has already been stored in the external storage medium, and moving the data that is extracted in the extracting the data to the other storage medium.

According to the image reader and the like in the present invention, the external storage medium that stores the image data acquired by reading the document can be connected to the image reader that reads the document. In the image reader, the storage capacity capable of storing information in the external storage medium at the time point of reading the document is detected, the size of the image data acquired by the reading the document is compared with the storage capacity of the external storage medium, the data to be moved to the other storage medium is extracted from the data that has already been stored in the external storage medium in the case where the size of the image data acquired by reading the document is larger than the storage capacity of the external storage medium, and the extracted data is moved to the other storage medium, so as to increase a free space of the external storage medium. As a result, the read image data can be stored without changing quality thereof. Therefore, it is possible to provide the image reader and the like capable of storing the image data, desired scan quality of which by a user is satisfied, in the external storage medium.

DESCRIPTION OF THE PREFERRED EMBODIMENTS

First Embodiment

A description will hereinafter be made on a first embodiment of the present invention with reference to the drawings.

Figure 1:
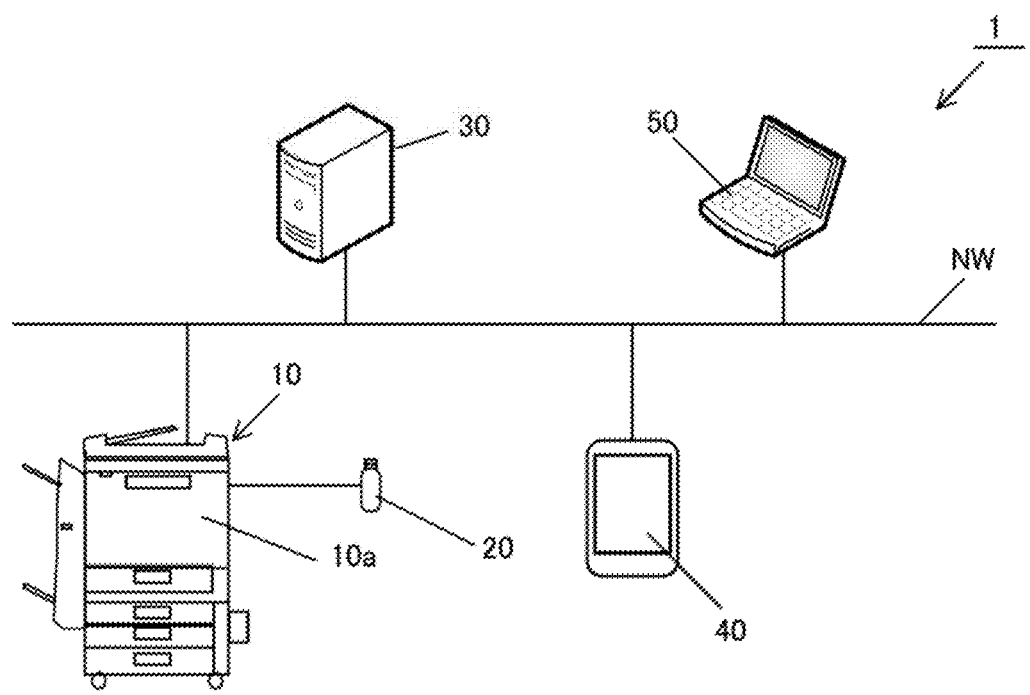
FIG. 1 is a descriptive view of an overall configuration of an image reading system that includes an image reader according to a first embodiment.
Figure 2:
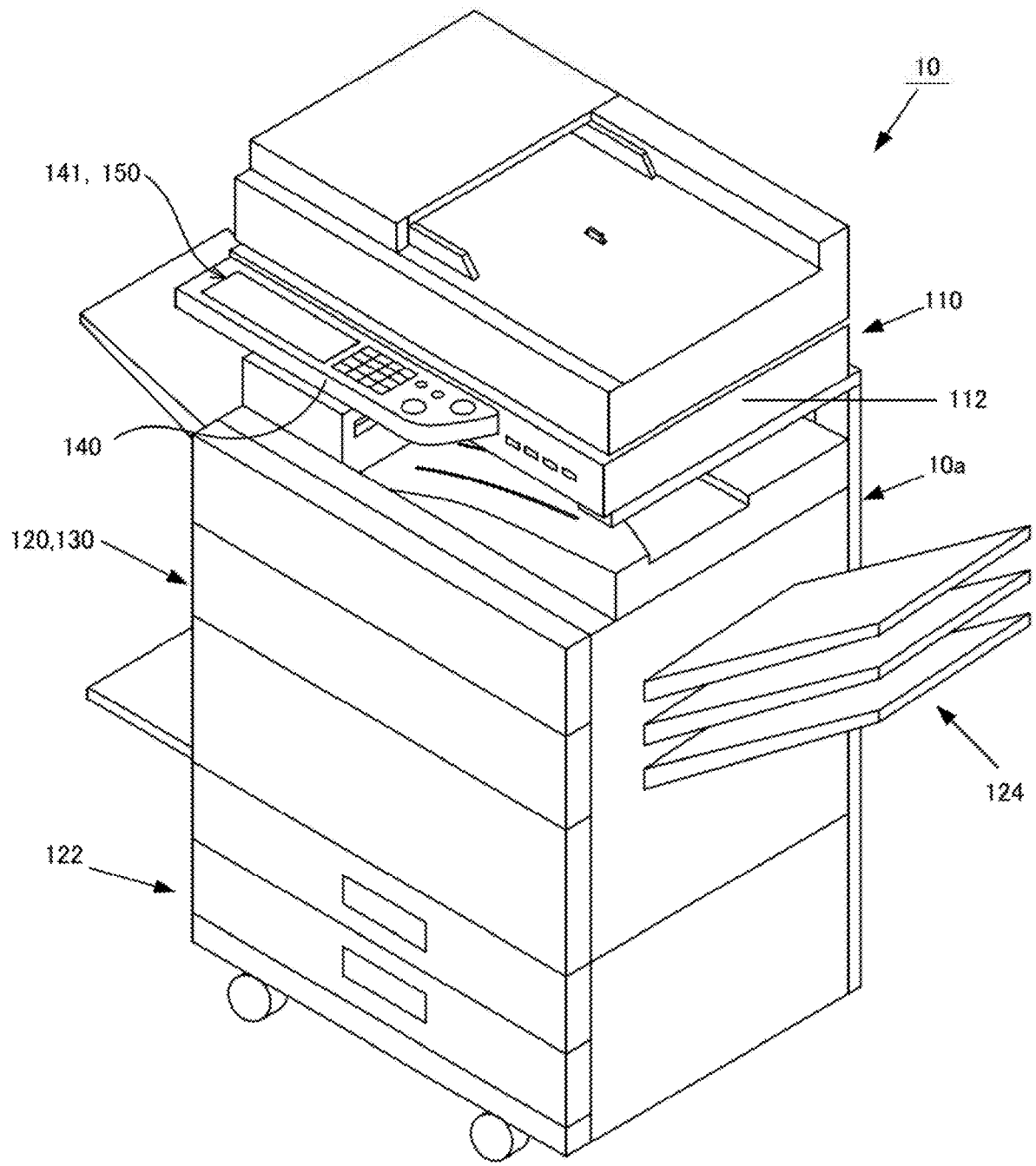
FIG. 2 is a descriptive view of a configuration of the image reader.
Figure 3:
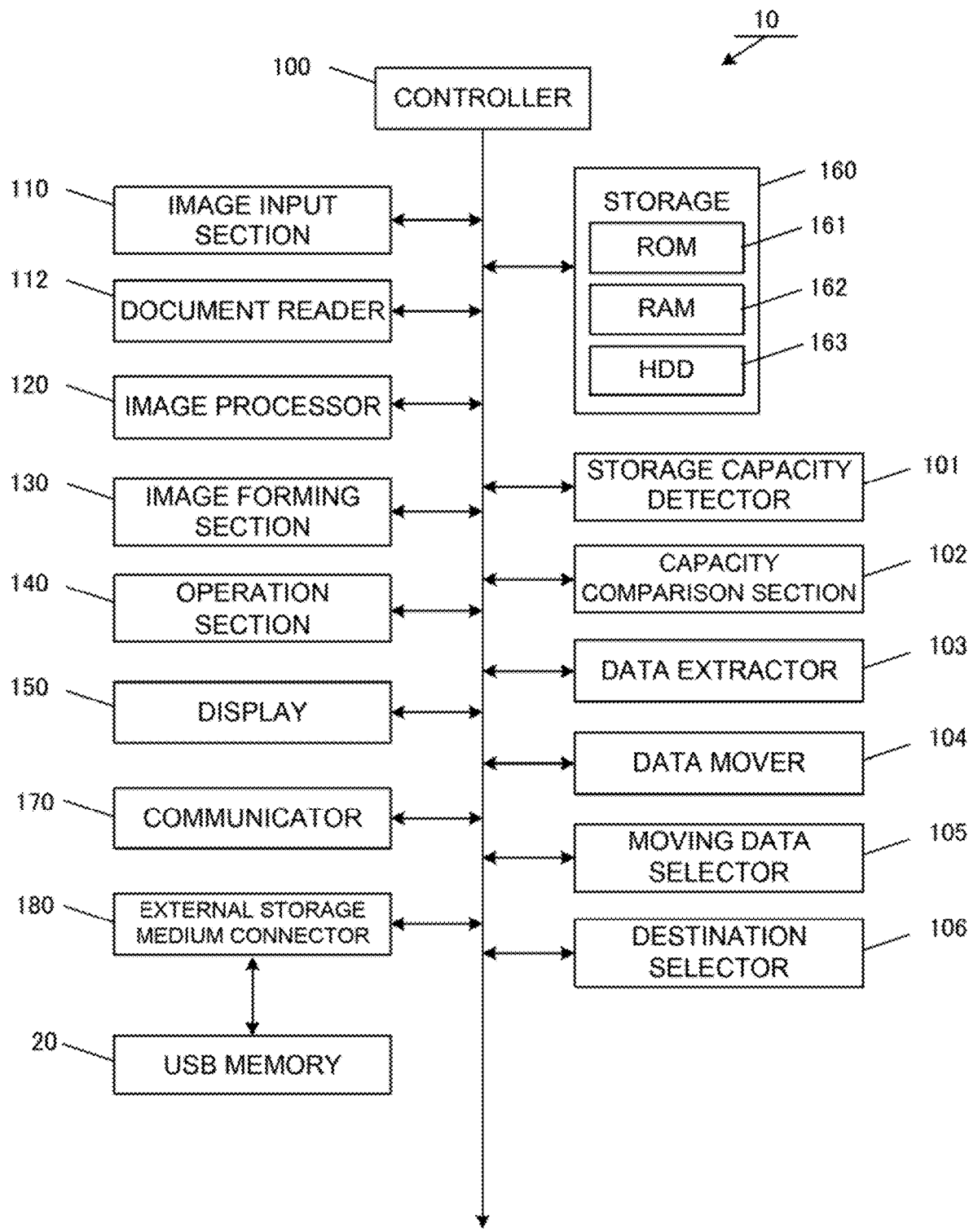
FIG. 3 is a block diagram of the configuration of the image reader.

FIG. 1 illustrates an example of a mode for carrying out the invention and is a descriptive view of an overall configuration of an image reading system that includes an image reader according to a first embodiment of the present invention. FIG. 2 is a descriptive view of a configuration of the image reader. FIG. 3 is a block diagram of the configuration of the image reader.

Configuration of Image Reading System

As illustrated in FIG. 1, the first embodiment is an image reading system 1 in which an image reader 10, a server 30, a mobile terminal 40, and a PC 50 are communicatively connected over a network NW. Universal Serial Bus (USB) memory 20 as an external storage medium is detachably attached to the image reader 10.

The image reader 10 has a document reading function (a scan function) and a function of saving image data that is generated by scanning in the attached USB memory 20. For example, while a user is out, the user can use the image reader 10 that is installed in a public space (a convenience store or the like) to store scan data of a document in the external storage medium.

Configuration of Image Reader

First, a description will be made on a configuration of the image reader 10 according to the first embodiment.

As illustrated in FIG. 2, the image reader 10 is an information processor that includes a document reader 112 in an upper portion of a reader body 10a to read an image of the document and outputs the image by an electrophotographic method.

As illustrated in FIG. 3, the image reader 10 primarily includes a controller 100, an image input section 110, the document reader 112, an image processor 120, an image forming section 130, an operation section 140, a display 150, a storage 160, a communicator 170, and an external storage medium connector 180.

In the first embodiment, as a characteristic configuration of the image reader 10, the image reader 10 further includes a storage capacity detector 101, a capacity comparison section 102, a data extractor 103, a data mover 104, a moving data selector 105, and a destination selector 106 in order to store the read image data in the USB memory 20 attached to the reader body 10a.

The controller 100 is a functional section for controlling the entire image reader 10.

The controller 100 fulfills various functions by reading and executing various programs and, for example, is constructed of one or a plurality of arithmetic devices (for example, a central processing unit (CPU)) and the like.

The image input section 110 is a functional section for reading the image data that is input to the image reader 10. The image input section 110 is connected to the document reader 112 as a functional section for reading the image of the document, and receives the image data that is output from the document reader 112.

The image input section 110 may also receive the image data from a storage medium such as the USB memory 20 or a secure digital (SD) card. The image input section 110 may further receive the image data from another terminal via the communicator 170 that is connected to the other terminal.

The document reader 112 has a function of optically reading the document that is placed on contact glass (not illustrated) and passing the scan data to the image forming section 130.

The image processor 120 is a functional section that creates output data based on the image data on a recording medium (for example, recording paper). For example, as illustrated in FIG. 2, the recording paper is fed from a paper feed tray 122, the image processor 120 creates the image on a surface of the recording, paper, and thereafter the recording paper is discharged from a paper discharge tray 124. For example, the image processor 120 is constructed of a laser printer adopting the electrophotographic method, or the like.

The image forming section 130 has a function of converting the image data that is read by the document reader 112 into a set file format (a tagged image file format (TIFF), a tagged image file format (GIF), a joint photographic experts group (JPEG), or the like). Then, the image forming section 130 creates an output image on the basis of the image data that has undergone image processing.

The operation section 140 is a functional section for accepting an operation instruction from the user, and is constructed of various key switches, a device that detects input by contact, and the like. The user uses the operation section 140 to input a function to be used and an output condition.

The display 150 is a functional section for showing various types of information to the user and is constructed of a liquid crystal display (LCD) or the like, for example.

That is, the operation section 140 provides a user interface used to operate the image reader 10, and the display 150 displays various setting menu screens of the image reader and messages.

As illustrated in FIG. 2, the image reader 10 may include, as components of the operation section 140, a touch panel in which an operation panel 141 and the display 150 are integrally formed. In this case, a method for detecting input on the touch panel can be any of general detection methods such as a resistance film method, an infrared method, an electromagnetic induction method, and an electrostatic capacity method.

The storage 160 is a functional section that stores the various programs including a control program required for operation of the image reader 10, various types of data including read data, and user information. For example, the storage 160 is constructed of a nonvolatile read only memory (ROM) 161, a random access memory (RAM) 162, a hard disk drive (HDD) 163, and the like.

The storage 160 may include a solid state drive (SSD) as that is semiconductor memory.

The ROM 161 stores a computer program for achieving the general operation of the image reader. The ROM 161 further stores screen data used to display various setting screens and the like on the operation section 140.

The RAM 162 provides a function as working memory that temporarily stores an arithmetic processing result by the CPU in the controller 100 and a function as frame memory that stores the image data.

The HDD 163 temporarily stores various types of data such as the image data that is acquired by scanning in the document reader 112.

The communicator 170 is communicatively connected to the server 30, the mobile terminal 40, the PC 50, and the like via the network NW.

A communication interface (communication I/F) used for data exchange is provided as the communicator 170, With the user's operation on the image reader 10, the communication I/F allows exchange of the data that is stored in the image reader 10 or the USB memory 20 connected to the image reader 10 with another computer that is connected thereto via the network NW.

The external storage medium connector 180 generally provides an interface for connecting the detachable external storage medium represented by the USB memory 20 to the image reader 10, and reads and writes the data in the HDD 163 and the RAM 162 to the external storage medium via an internal bus of the image reader 10.

The storage capacity detector 101 detects a storage capacity that is a so-called free space capable of storing information in the USB memory 20 at the time of reading the document.

The capacity comparison section 102 compares size of the image data that is acquired by reading the document with the free space of the USB memory 20.

The data extractor 103 extracts data to be moved to another storage medium from the data that has already been stored in the USB memory 20. In the first embodiment, the data extractor 103 automatically extracts data that satisfies a specified condition from the data that has already been stored in the USB memory 20.

The data extractor 103 may extract the data to be moved on the basis of a date and time when the data is recorded, the storage capacity, a type of the data, and the like, for example.

The data mover 104 moves the data that is extracted by the data extractor 103 to the other storage medium. In the first embodiment, the data mover 104 is configured to allow the user to determine whether to move the data to the other storage medium.

The moving data selector 105 selects data to be moved to the other storage medium from the data that is extracted by the data extractor 103.

The destination selector 106 selects, for each piece of the data to be moved, a destination of the data that is extracted by the data extractor 103.

Case where Image Data Read by Image Reader is Stored

Next, a description will be made on an example of a case where the image data that is read by the image reader 10 according to the first embodiment is stored in the USB memory 20 owned by the user with reference to a flowchart.

Figure 4:
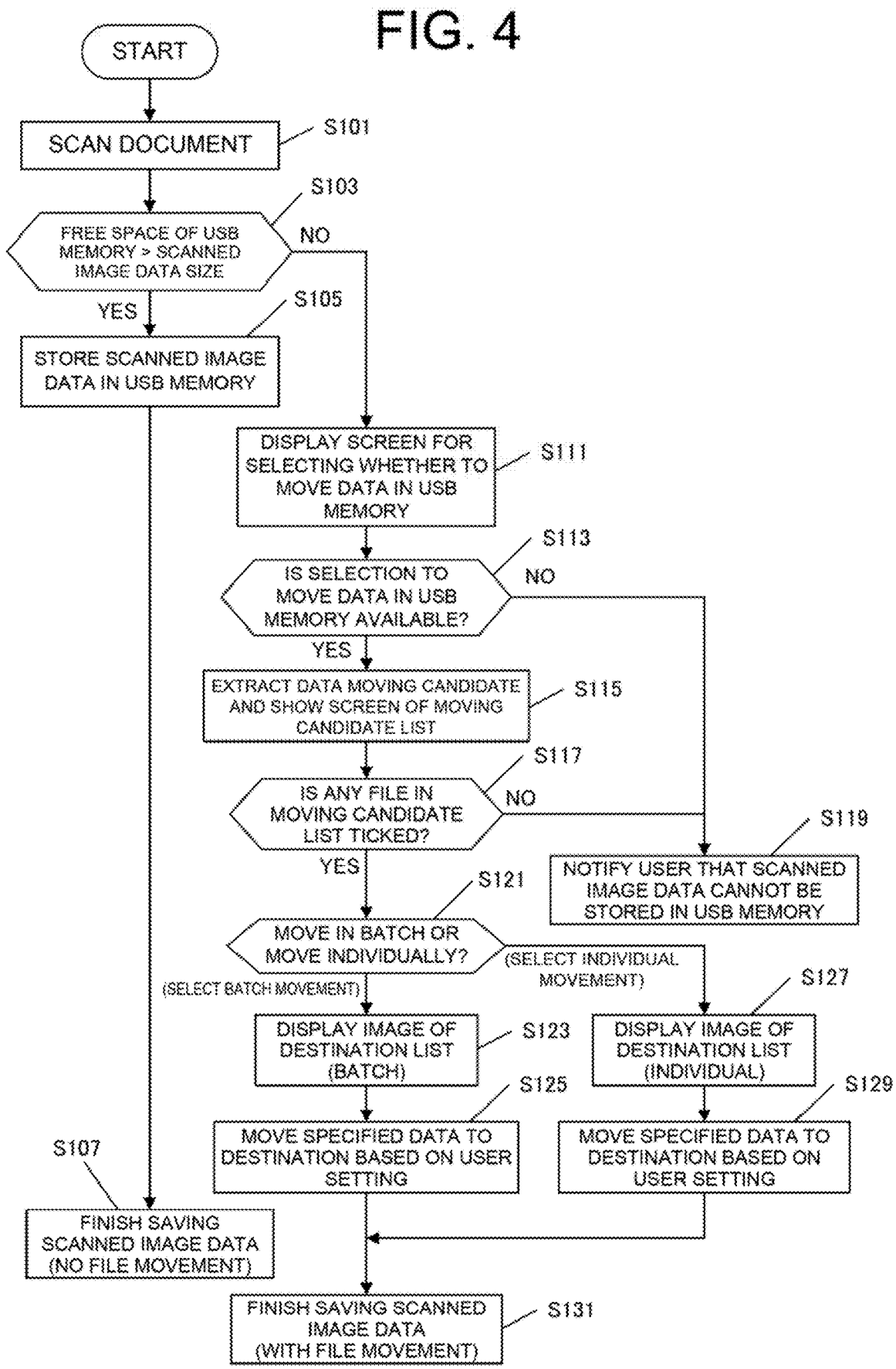
FIG. 4 is a flowchart of an exemplary procedure of recording image data in USB memory, the image data being acquired by reading a document in the image reader.

FIG. 4 is a flowchart of an exemplary procedure of recording the image data, which is acquired by reading the document in the image reader according to the first embodiment, in the USB memory.

As illustrated in FIG. 4, when document scan processing is initiated in the image reader 10 (step S101), it is first determined whether the free space of the USB memory 20 used by the user is larger than the size of the image data that is scanned (hereinafter referred to as "scanned image date") (step S103).

If it is determined in step S103 that the free space of the USB memory 20 used by the user is larger than the size of the scanned image data, the scanned image data is stored in the USB memory 20 (step S105), and saving processing of the scanned image data is terminated (step S107).

On the other hand, if it is determined in step S103 that the free space of the USB memory 20 used by the user is not larger than the size of the scanned image data, the display 150 displays an operation screen for selecting whether to move the data that has already been stored in the USB memory 20 (step S111).

Then, on the operation screen appearing on the display 150, it is determined whether to move the data that has already been stored in the USB memory 20 (step S113).

If it is selected in step S113 not to move the data that has already been stored in the USB memory 20, the user is notified that the scanned image data will not be stored in the USB memory 20 by showing a message or the like on the display 150 (step S119).

On the other hand, if it is selected in step S113 to move the data that has already been stored in the USB memory 20, the data extractor 103 extracts a candidate(s) of the data to be moved and creates a "moving candidate list", and the list appears on the screen of the display 150 (step S115). The data to be moved is decided when the user selects the data in the moving candidate list.

For example, in the moving candidate list, of the data that is stored in the USB memory 20, the data having the large data size and an older update date and time may preferentially be listed as the moving candidate.

Then, it is determined whether a file(s) in the moving candidate list is ticked for selection (step S117). If it is determined in step S117 that the file(s) in the moving candidate list is not ticked for the selection, the processing proceeds to step S119.

On the other hand, if it is determined in step S117 that the files in the moving candidate list are ticked for the selection, the processing proceeds to step S121, and it is determined whether to move the files in a batch or move the files individually.

If it is determined in step S121 to move the files in the batch, the display 150 displays an image of a moving candidate file list (batch) as a destination list (step S123). Then, the specified data is moved to the destination on the basis of the user settings (step S125). Next, the scanned image data is saved in the USB memory 20, and the processing is terminated (step S131).

On the other hand, if it is determined in step S121 to move the files individually, the display 150 displays an image of a moving candidate file list (individual) as the destination list (step S127). Then, the specified data is moved to the destination on the basis of the user settings (step S129). Next, the scanned image data is saved in the USB memory 20, and the processing is terminated (step S131).

Display Screen Appearing on Display of Image Reader

Next, a description will be made on a display screen that appears on the display 150 of the image reader 10.

Figure 5:
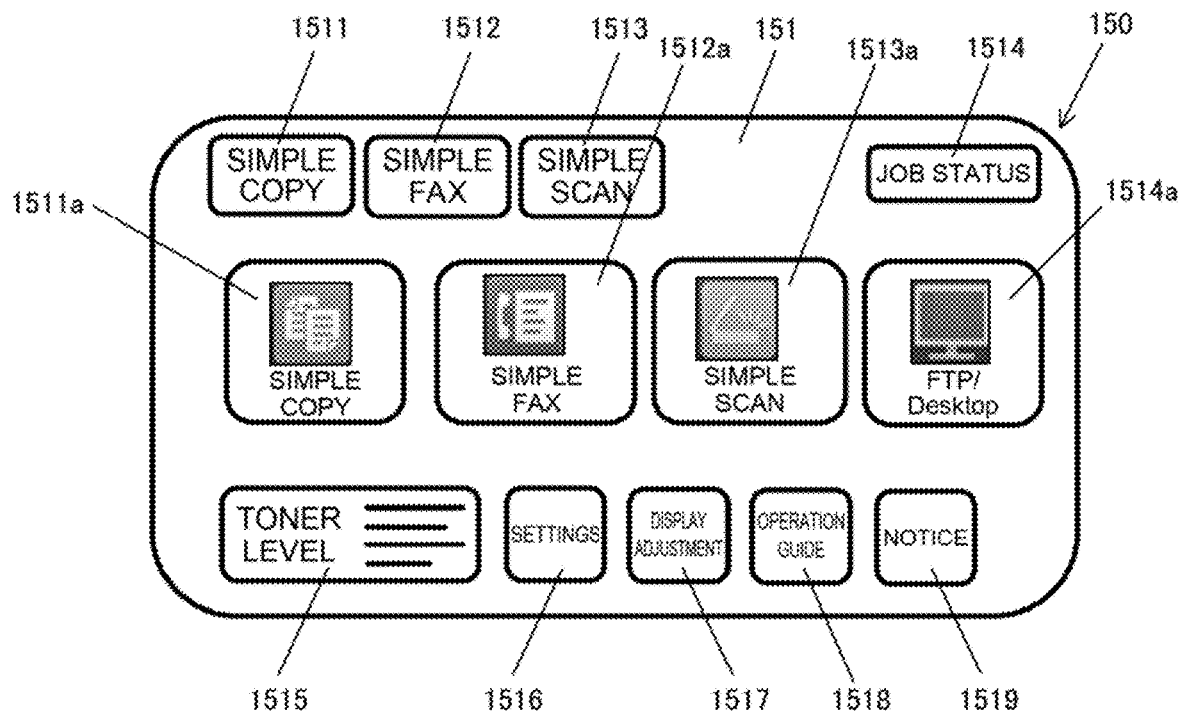
FIG. 5 is a descriptive view of an example of an initial setting screen appearing on a display of the image reader.
Figure 6:
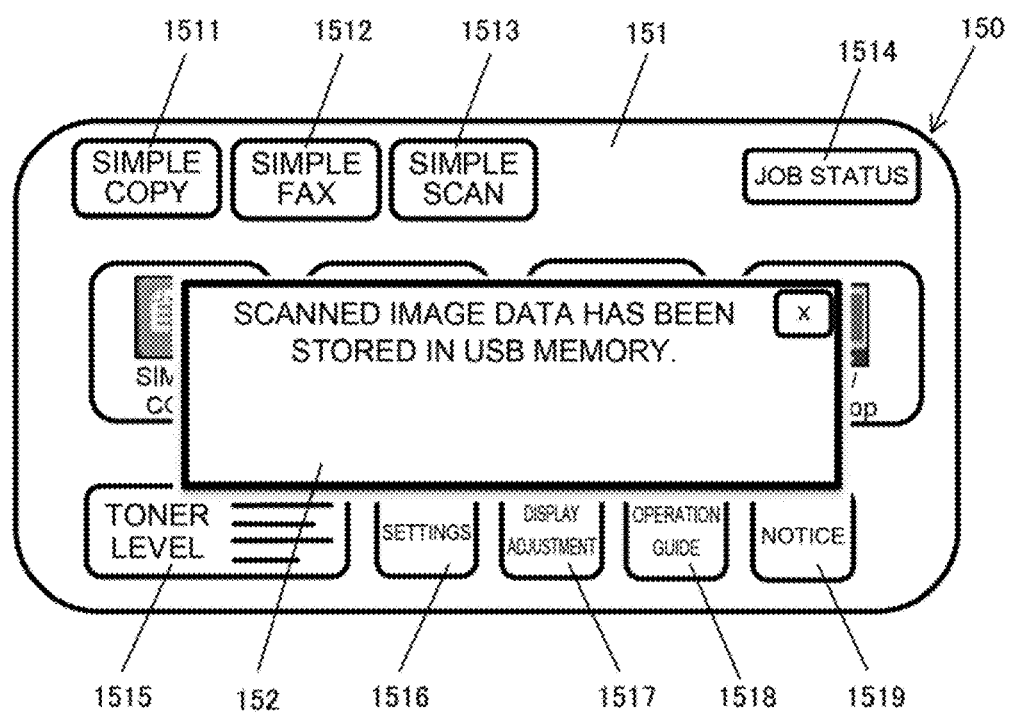
FIG. 6 is a descriptive view of an example of a display screen at the time of storing data in the case where the USB memory attached to the image reader has a free space.
Figure 7:
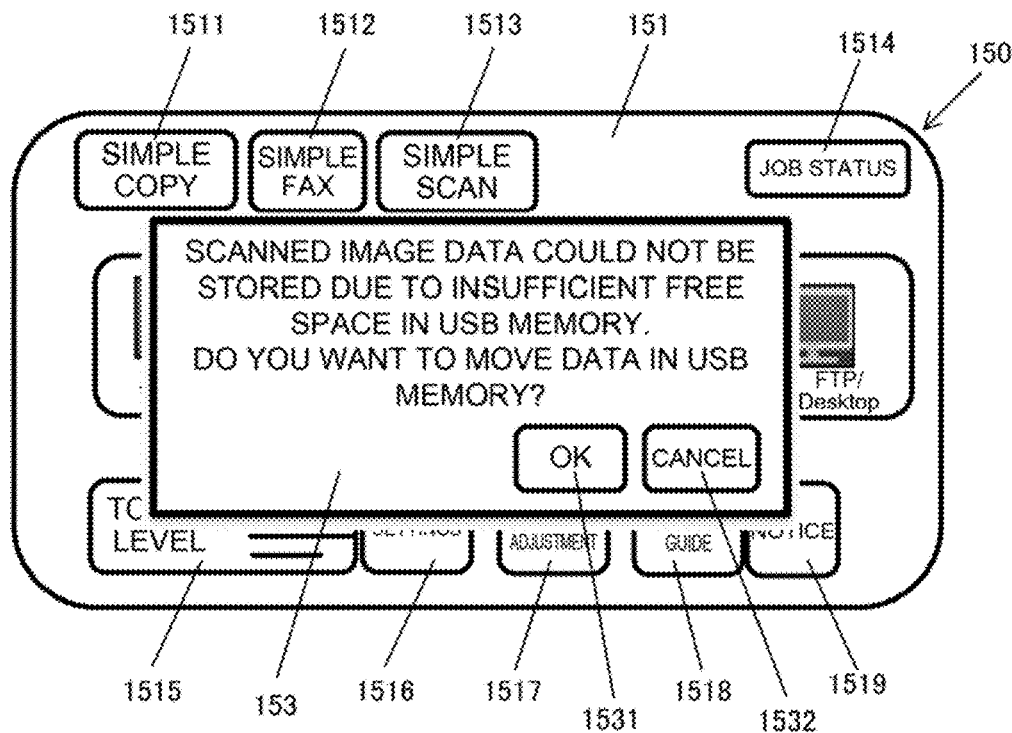
FIG. 7 is a descriptive view of an example of the display screen at the time of storing the data in the case where the USB memory does not have the free space.
Figure 8:
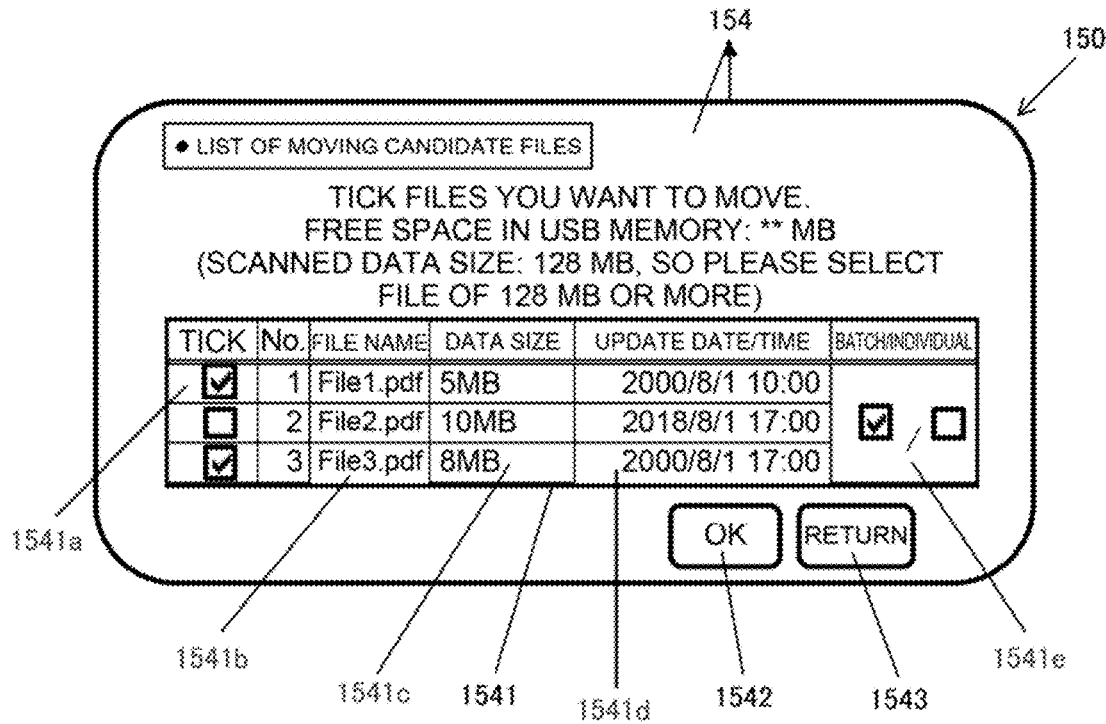
FIG. 8 is a descriptive view of an example of a list of moving candidate files that is extracted from the USB memory.
Figure 9:
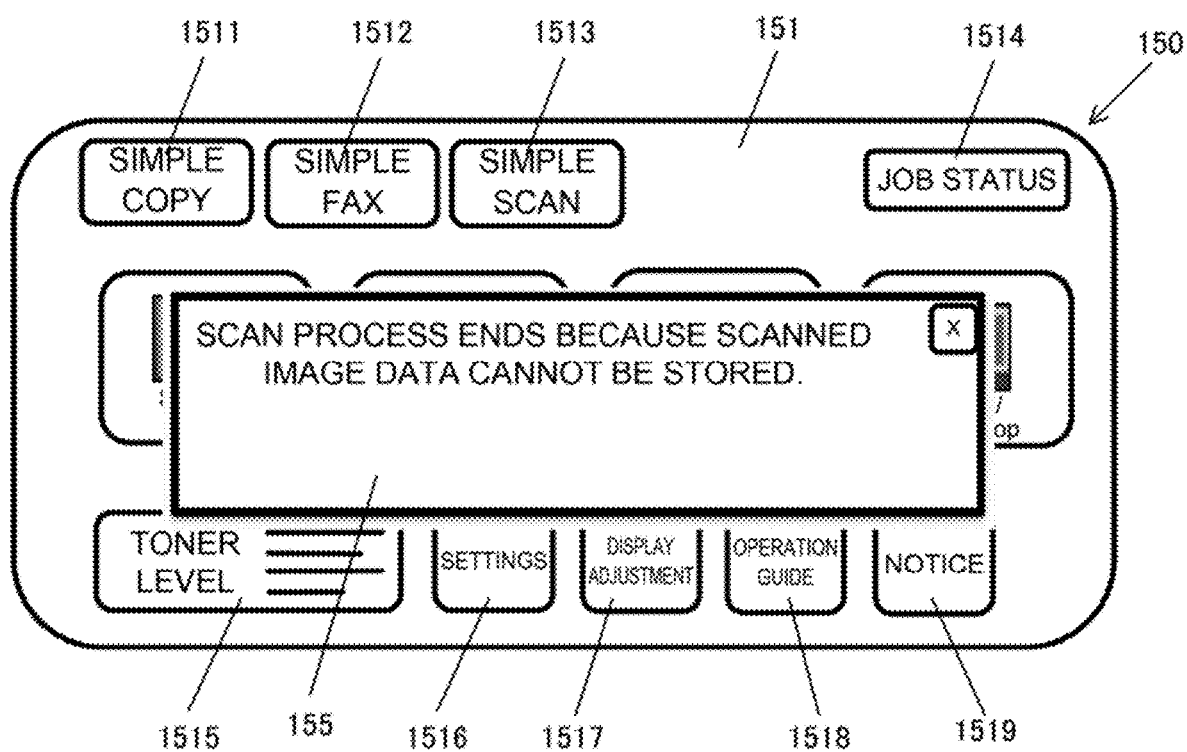
FIG. 9 is a descriptive view of an example of a display screen in the case where scanned image data is not saved in the USB memory.
Figure 10:
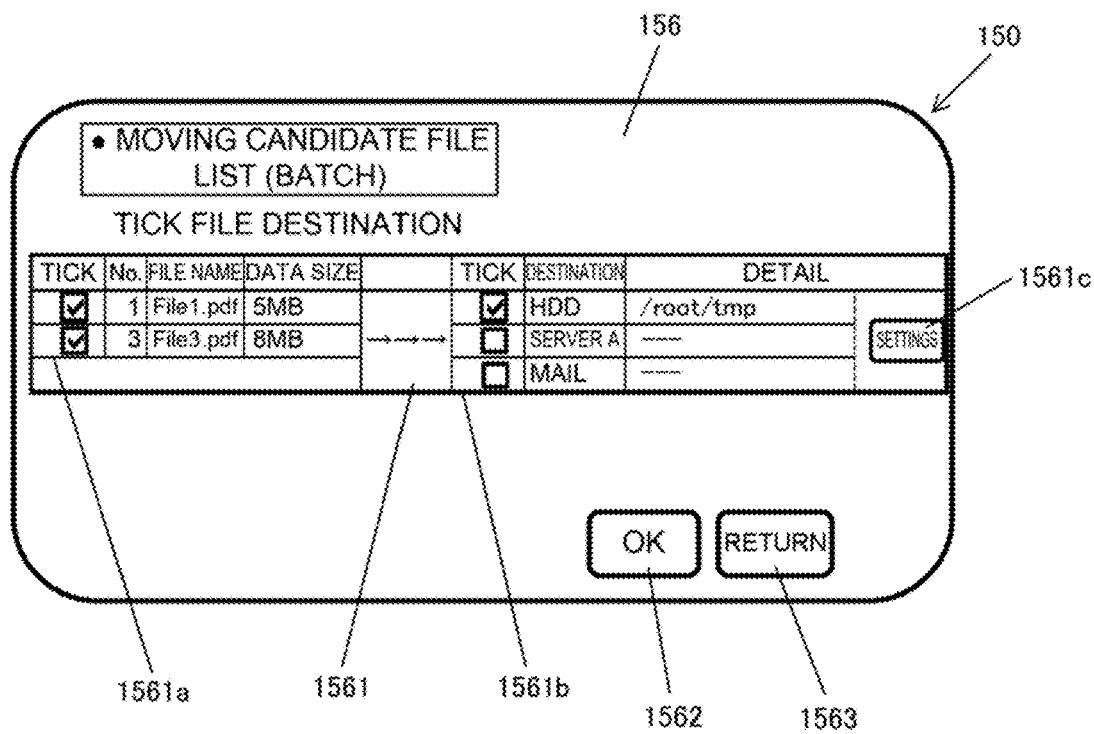
FIG. 10 is a descriptive view of an example of a list for selecting the moving candidate files, which are extracted from the USB memory, in a batch.
Figure 11:
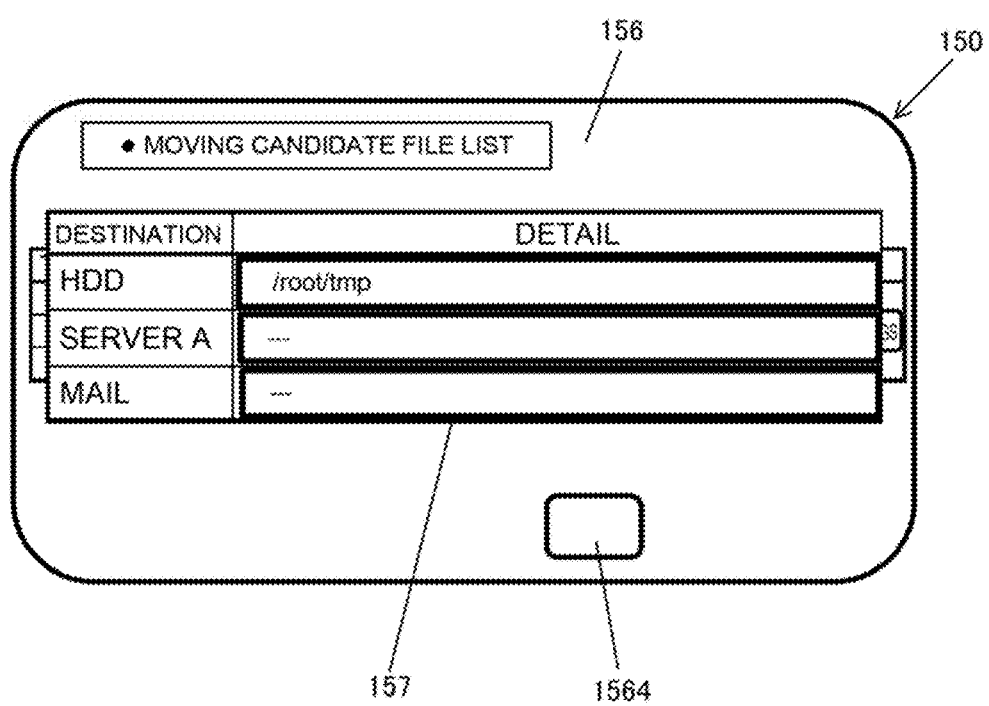
FIG. 11 is a descriptive view of an example of a list showing destinations of the moving candidate files.
Figure 12:
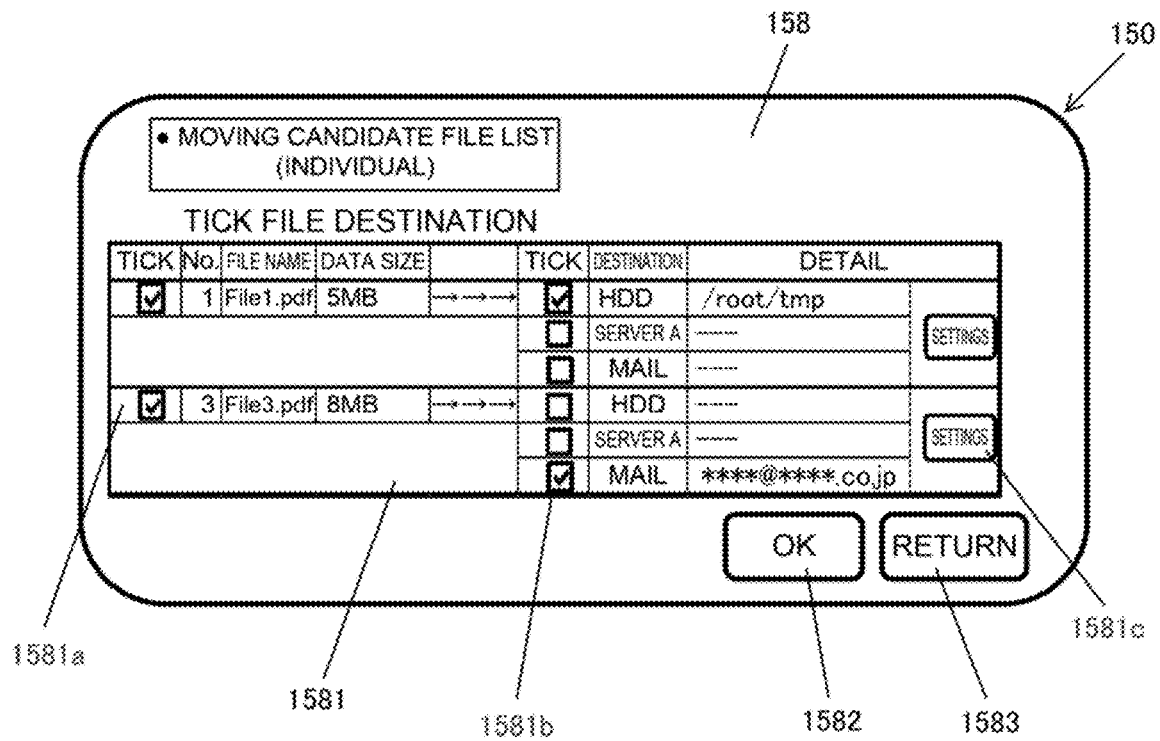
FIG. 12 is a descriptive view of an example of a list for individually selecting the moving candidate files that are extracted from the USB memory.
Figure 13:
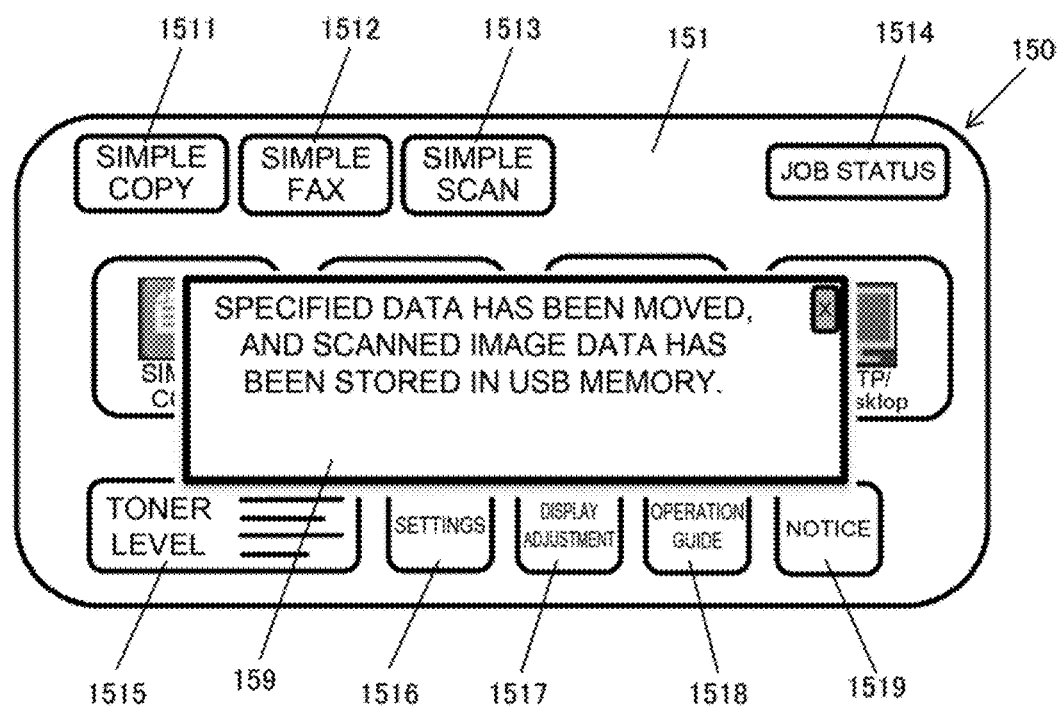
FIG. 13 is a descriptive view of an example of a display screen in the case where a specified file is moved to save the scanned image data.

FIG. 5 is a descriptive view of an example of an initial setting screen (a default display screen) appearing on the display of the image reader. FIG. 6 is a descriptive view of an example of a display screen at the time of storing the data in the case where the USB memory attached to the image reader has the free space. FIG. 7 is a descriptive view of an example of the display screen at the time of storing the data in the case where the USB memory does not have the free space. FIG. 8 is a descriptive view of an example of the list of the moving candidate files that are extracted from the USB memory. FIG. 9 is a descriptive view of an example of a display screen in the case where the scanned image data is not saved in the USB memory. FIG. 10 is a descriptive view of an example of a list for selecting the moving candidate files, which are extracted from the USB memory, in the batch. FIG. 11 is a descriptive view of an example of the list showing the destinations of the moving candidate files. FIG. 12 is a descriptive view of an example of the list for individually selecting the moving candidate files that are extracted from the USB memory. FIG. 13 is a descriptive view of an example of a display screen in the case where the specified file is moved to save the scanned image data.

In the image reader 10 according to the first embodiment, when the user operates the display 150, the display 150 displays an initial setting screen 151 as illustrated in FIG. 5.

The initial setting screen 151 shows a copy key 1511 for selecting a processing function, a fax key 1512, a scan key 1513, a job status key 1514 for showing a job status, a copy display 1511*a* for clearly indicating the selected processing function, a fax display 1512*a*, a scan display 1513*a*, a desk top display 1514*a*, a toner level display 1515, a setting key 1516, a display adjustment key 1517, an operation guide key 1518, a notice key 1519, and the like.

Display Example when USB Memory has Free Space

In the case where the sufficient free space that is equal or larger than the data size of the scanned image data is available in the USB memory 20, the scanned image data is saved in the USB memory 20. Then, as illustrated in FIG. 6, on the display 150, a display screen 152 showing a message that the scanned image data is saved in the USB memory 20 is superimposed on the initial setting screen 151.

Display Example when USB Memory has Insufficient Free Space

In the case where the free space of the USB memory 20 is smaller than the data size of the scanned image data, as illustrated in FIG. 7, a file moving selection screen 153 showing a message that the scanned image data cannot be saved in the USB memory 20 is superimposed on the initial setting screen 151 of the display 150.

The file moving selection screen 153 shows the message that the scanned image data cannot be saved in the USB memory 20, a message for selecting whether to move the data in the USB memory 20, a selection key 1531, and a cancel key 1532.

In the case where the selection key 1531 is operated, the processing proceeds to processing of moving the data.

In the case where the cancel key 1532 is operated, the processing of saving the scanned image data is terminated.

This screen may also show the scanned image data size (for example, 12 MB), the free space of the USB memory (for example, 10 MB), and the space that is insufficient to save the read image data (for example, 2 MB).

Alternatively in consideration of the free space of the USB memory for example, a notification that "SCANNED DATA SIZE: 12 MB, FREE SPACE SIZE: 10 MB, SO PLEASE SELECT A FILE(S) OF 2 MB OR LARGER" may be made for the user to select and move the file, the size of which corresponds to the insufficient space.

Display of Moving Candidate File List

In the case where the selection key 1531 is operated on the file moving selection screen 153, as illustrated in FIG. 8, a moving candidate file selector 1541 showing the list of the moving candidate files, a selection key 1542, and a return key 1543 appear.

A display order of the list may be based on the date and the time when the data is recorded, a magnitude of the data size, a type of the data, frequency of use, and the like according to the user's selection.

The moving candidate file selector 1541 shows a file tick field 1541*a* for selecting the file, a file name 1541*b*, data size 1541*c*, and an update date/time 1541*d*, and also shows a file selection method setting section 1541*e* used to select whether to select the files in the batch or individually Display of Termination of Scan Processing In the case where the cancel key 1532 is operated on the file moving selection screen 153, as illustrated in FIG. 9, a scan termination display screen 155 showing a message that the scan processing is terminated because the scanned image data cannot be saved is superimposed on the initial setting screen 151 of the display 150.

Case where Moving Candidate Files are Selected in Batch

In the case where the moving candidate files that are listed in the moving candidate file selector 1541 are selected in the batch, "BATCH" is selected in the file selection method setting section 1541*e* illustrated in FIG. 8. Then, as illustrated in FIG. 10, the display 150 displays a moving candidate file list (batch) display screen 156 on which the destination of the files can be selected in the batch.

The moving candidate file list (batch) display screen 156 shows a moving candidate file selector 1561 in which the destination of the files can be selected in the batch, a selection key 1562, and a return key 1563.

The moving candidate file selector 1561 includes a file tick field 1561*a* for selecting the file to be moved, a destination tick field 1561*b* for selecting the destination of the files in the batch, and a setting key 1561*c*.

Display of Detailed Information on File Destination

When the setting key 1561*c* is operated in the moving candidate file selector 1561, as illustrated in FIG. 11, together with an enter key 1564, a file destination detailed display 157 displaying detailed information on the destination of the selected files is superimposed on the moving candidate file list (batch) display screen 156. After the detailed information on the destination of the files is checked on the file destination detailed display 157, the destination of the files can be confirmed by operating the enter key 1564.

Case where Moving Candidate Files are Selected Individually

In the case where the moving candidate files that are listed in the moving candidate file selector 1541 are selected individually, "INDIVIDUAL" is selected in the file selection method setting section 1541*e* illustrated in FIG. 8. Then, as illustrated in FIG. 12, the display 150 shows a moving candidate file list (individual) display screen 158 on which the destination of each of the files can be selected individually.

The moving candidate file list (individual) display screen 158 shows a moving candidate file selector 1581 in which the destination of each of the files can be selected individually, a selection key 1582 and a return key 1583.

The moving candidate file selector 1581 includes a file tick field 1581*a* for selecting the file to be moved, a destination tick field 1581*b* for individually selecting the destination per the file, and a setting key 1581*c*.

Display when Saving of Scanned Image Data is Completed

In the case where saving of the scanned image data is completed, as illustrated in FIG. 13, a display screen 159 showing a message that the specified file has been moved and the scanned image data has been saved in the USB memory 20 is superimposed on the initial setting screen 151 of the display 150.

With the configuration that has been described so far, according to the first embodiment, the USB memory 20 can be connected to the image reader 10 that reads the document, and the image reader 10 includes the storage capacity detector 101, the capacity comparison section 102, the data extractor 103, and the data mover 104. In the case where the USB memory 20 does not have the sufficient free space for storing the scanned image data, the file stored in the USB memory 20 is moved to increase the free space of the USB memory 20. In this way, the scanned image data can be stored therein. As a result, the scanned image data can be stored without preparing the additional external storage medium, and the scanned image data can be stored without changing quality of the read image data. Therefore, the image data that satisfies scan quality desired by the user can be stored in the USB memory 20.

In addition, in the first embodiment, the moving data selector 105 and the moving destination selector 106 are provided. Accordingly, the destination of each of the moving candidate files extracted by the data extractor 103 can be selected in the batch or individually in the moving candidate file selector 1561, in which the destination of the files can be selected in the batch, or in the moving candidate file selector 1581, in which the destination of each of the files can be selected individually. Therefore, each of the selected files can easily be moved to the specified destination.

Second Embodiment

Next, a description will be made on a second embodiment.

In the second embodiment, the data to be moved in the image reader is automatically selected on, the basis of a specified condition, and the destination of the data to be moved is automatically selected.

Figure 14:
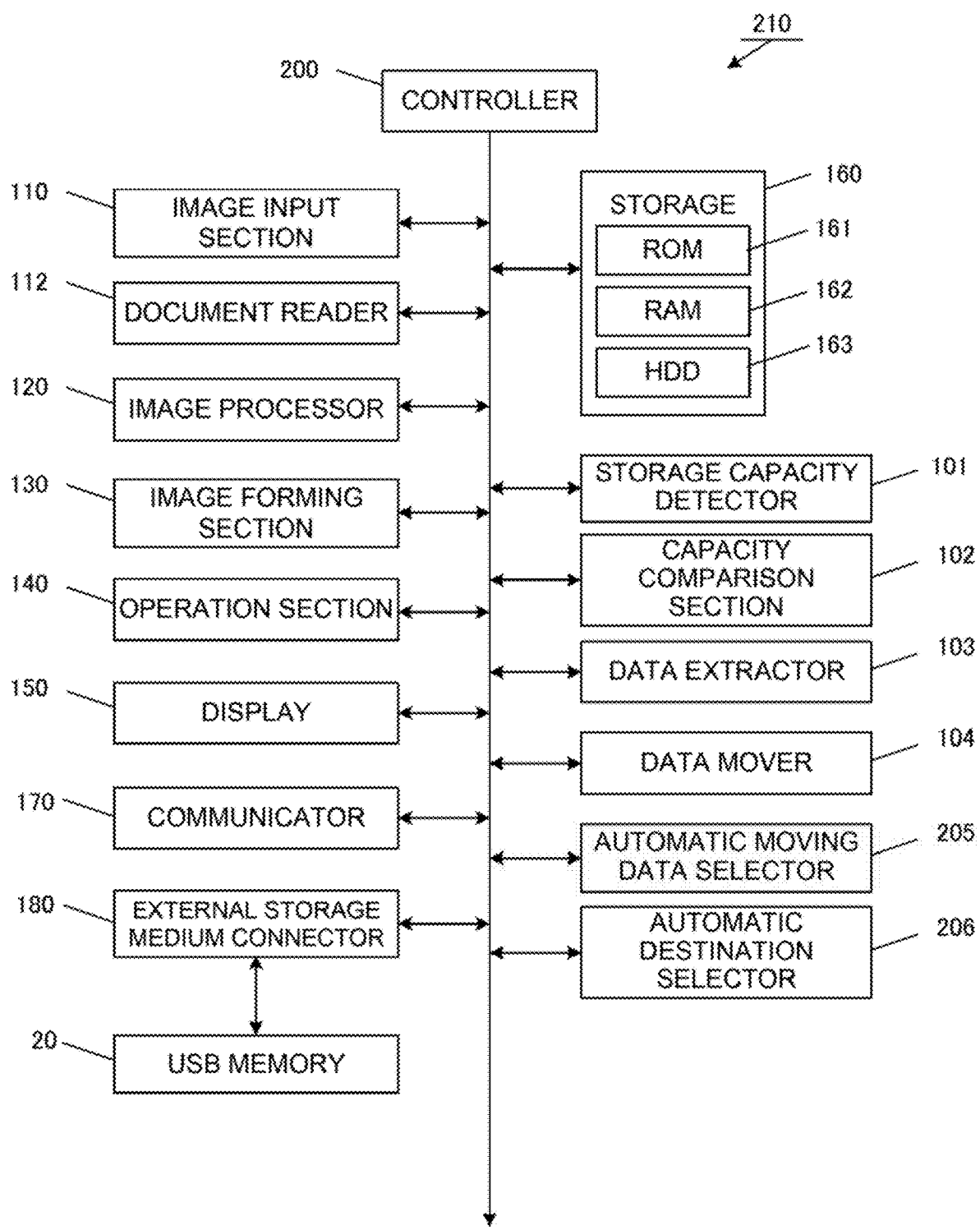
FIG. 14 is a block diagram of a configuration of an image reader according to a second embodiment.

FIG. 14 is a block diagram of a configuration of the image reader according to the second embodiment.

In the second embodiment, for convenience of the description, the same components as those of the image reader 10 in the first embodiment will be denoted by the same reference numerals, and the description thereon will not made.

As illustrated in FIG. 14, an image reader 210 according to the second embodiment includes an automatic moving data selector 205 and an automatic destination selector 206 instead of the moving data selector 105 and the destination selector 106 in the image reader 10 according to the first embodiment.

In the first embodiment, in regard to the selection of the data to be moved in the USB memory 20, the moving data selector 105 in the image reader 10 specifies the data to be moved through the user's selection. In the second embodiment, the automatic moving data selector 205 in the image reader 210 automatically selects the data to be moved on the basis of the date and the time when the data is recorded, the storage capacity, the type of the data, and the like.

A controller 200 controls the entire image reader 210.

In addition, in the first embodiment, in regard to the selection of the destination of the data to be moved, the destination selector 106 specifies the destination of the data to be moved through the user's selection. In the second embodiment, the automatic destination selector 206 automatically selects the destination of the data to be moved on the basis of a magnitude of the free space in which the scanned image data can be stored.

Regarding Automatic Moving Data Selector.

In the image reader 210 according to the second embodiment, when selecting the data to be moved on the basis of the date and the time when the data is recorded, the automatic moving data selector 205 preferentially selects the data with the older recorded date and time.

When selecting the data to be moved on the basis of the data size, the automatic moving data selector 205 preferentially selects the data in the larger size.

When selecting the data to be moved on the basis of the type of the data, the automatic moving data selector 205 preferentially selects the type of the data with the lower frequency of use.

The data to be moved may be selected by appropriately combining the date and the time when the data is recorded, the data size, and the type of the data.

Regarding Automatic Destination Selector

In the image reader 210 according to the second embodiment, in regard to the selection of the destination of the data to be moved, the automatic destination selector 206 automatically selects the external storage medium with the larger free space on the basis of the magnitude of the free space in which the scanned image data can be stored.

With the configuration that has been described so far, according to the second embodiment, the image reader 210 includes the automatic moving data selector 205 and the automatic destination selector 206. Accordingly, the file to be moved is automatically selected from the moving candidate files that are extracted by the data extractor 103, and the destination of the file to be moved is automatically selected. Therefore, in addition to the effects exhibited by the image reader 10 according to the first embodiment, the file to be moved can easily be moved to the specified destination.

Third Embodiment

Next, a description will be made on a third embodiment.

In the third embodiment, in an image reader, in regard to storing of the scanned image data in the USB memory, in the case where the scanned image data is moved from the USB memory and the free space is thereby secured in the USB memory, the file that has been moved from the USB memory to the other storage medium in order to secure the free space of the USB memory returns to an original location.

Figure 15:
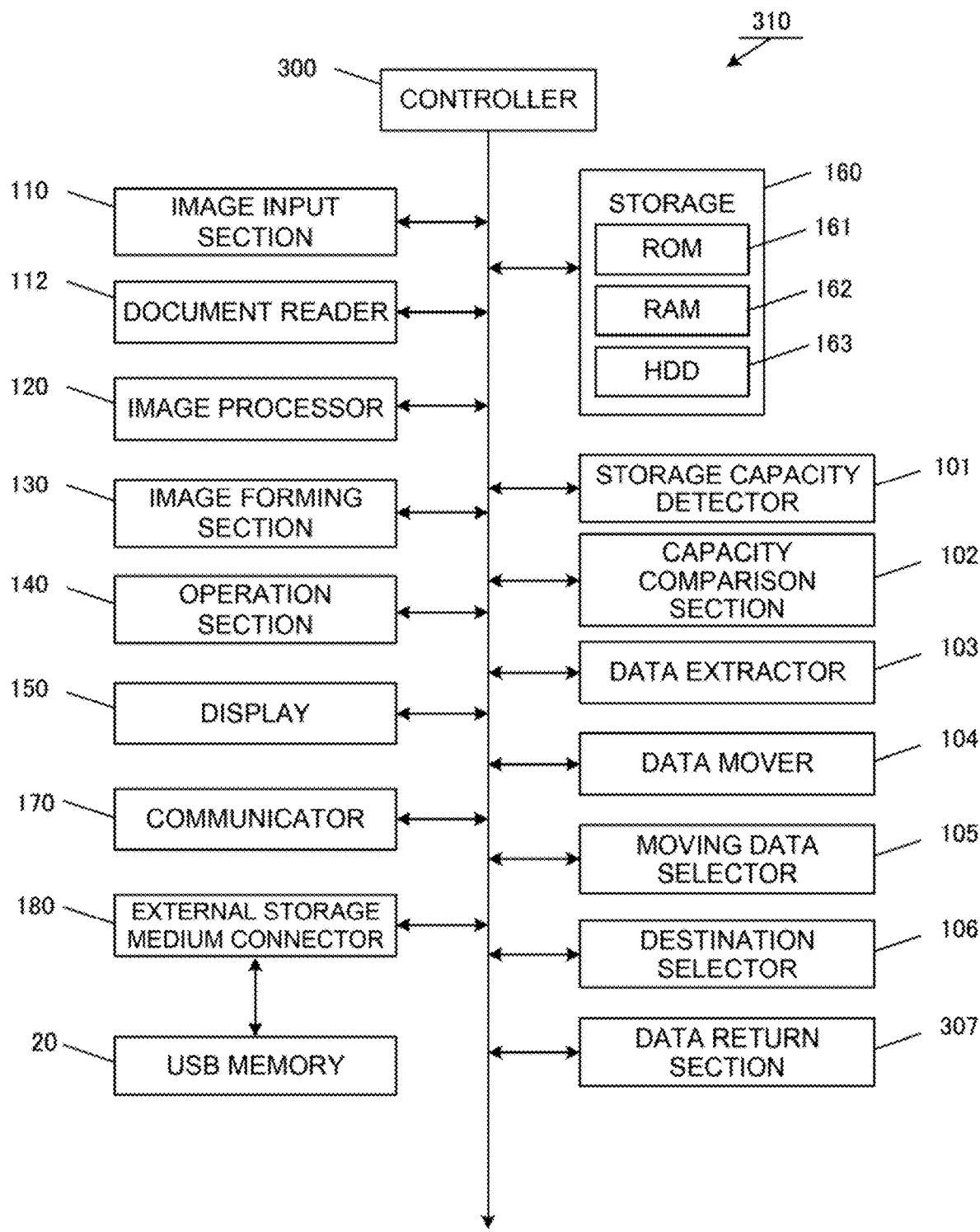
FIG. 15 is a block diagram of a configuration of an image reader according to a third embodiment.

FIG. 15 is a block diagram of a configuration of the image reader according to a third embodiment.

In the third embodiment, for convenience of the description, the same components as those of the image reader 10 in the first embodiment will be denoted by the same reference numerals, and the description thereon will not made.

As illustrated in FIG. 15, an image reader 310 according to the third embodiment includes a data return section 307 in addition to the components of the image reader 10 according to the first embodiment.

In the image reader 310, in the case where the free space of the USB memory 20 is insufficient to store the scanned image data at the time when the scanned image data is stored in the USB memory 20, in order to secure the free space of the USB memory 20, the selected file is moved from the USB memory 20 to the other storage medium.

In the third embodiment, when the scanned image data is moved from the USB memory 20 and the free space is thereby secured, the data return section 307 returns the file that has been moved previously to the original location.

When determining that the user who operates the USB memory 20 is the user who has operated the USB memory 20 at the time of storing the scanned image data, the data return section 307 moves the data that has been moved previously to the USB memory 20.

A controller 300 controls the entire image reader 310.

With the configuration that has been described so far, according to the third embodiment, the image reader 310 includes the data return section 307 in addition to the components of the image reader 10 according to the first embodiment. Accordingly, the file that has been moved from the USB memory 20 at the time of storing the scanned image data in the USB memory 20 is returned by the operation of the user who has moved such a file. Therefore, in addition to the effects exhibited in the first embodiment, the file can be moved legitimately without further movement of the file, which has been moved, by a third party.

As it has been described so far, the present invention is not limited to the above-described embodiments, and various modifications can be made thereto within the scope of the claims. It is obvious that a person skilled in the art could have easily arrived at various modification examples or various correction examples that fall within the scope of the claims. That is, embodiments obtained by combining technical means that are appropriately modified within the scope that does not depart from the gist of the invention are also included in the technical scope of the present invention.

DESCRIPTION OF REFERENCE NUMERALS

1: Image reading system
10, 210, 310: Image reader
20: USB memory (external storage medium)
30: Server
40: Mobile terminal
100, 200, 300: Controller
101: Storage capacity detector
102: Capacity comparison section
103: Data extractor
104: Data mover
105: Moving data selector
106: Destination selector
110: Image input section
112: Document reader
140: Operation section
150: Display
160: Storage
170: Communicator
180: External storage medium connector
205: Automatic moving data selector
206: Automatic destination selector
307: Data return section

What is claimed is:

1. An image reader that reads image data of a document by scan processing and is connectable with an external storage medium that stores the image data acquired by reading the document, the image reader comprising:
   a storage capacity detector that detects storage capacity capable of storing information in the external storage medium at a time point of reading the document;
   a capacity comparison section that compares a size of the image data acquired in the scan processing of the image data with the storage capacity of the external storage medium;
   a data extractor that extracts data to be moved to a different storage medium from data that has been stored in the external storage medium; and
   a data mover that moves the data extracted by the data extractor to the different storage medium; and
   a data return section that returns the data, that has been moved to the different storage medium, from the different storage medium to the external storage medium in a case where a free space is secured in the external storage medium by moving the image data of the document from the external storage medium after the data has been moved by the data mover and the image data of the document has been stored in the external storage medium.

2. The image reader according to claim 1, wherein the data extractor automatically extracts data that satisfies a specified condition from the data that has been stored in the external storage medium.

3. The image reader according to claim 2, further comprising a display that allows an input operation on a screen, wherein
   the display displays a list of the data that is extracted by the data extractor.

4. The image reader according to claim 1, further comprising a display that allows an input operation on a screen, wherein
   the display displays a list of the data that is extracted by the data extractor.

5. The image reader according to claim 1, wherein the data mover allows a user to select whether to move data to the different storage medium.

6. The image reader according to claim 1, further comprising a moving data selector that selects the data to be moved to the different storage medium from the data that is extracted by the data extractor.

7. The image reader according to claim 6, wherein the moving data selector selects the data to be moved individually or in a batch.

8. The image reader according to claim 6, wherein the moving data selector automatically selects the data to be moved based on a specified condition.

9. The image reader according to claim 1, further comprising a destination selector that selects a destination of the data extracted by the data extractor per data to be moved.

10. The image reader according to claim 9, wherein the destination selector selects, as a selectable data destination, a recording medium that is mounted on the image reader.

11. The image reader according to claim 9, wherein the destination selector selects, as a selectable data destination, a different external storage medium that is connected to the image reader over a network.

12. The image reader according to claim 1, wherein
when determining that a user who operates the external storage medium having the storage capacity is a user who has operated the data moved, the data return section returns the data moved to the external storage medium having the storage capacity.

13. The image reader according to claim 1, wherein
the data extractor that extracts data having a large data size and an older update date and time.

14. The image reader according to claim 1, wherein
the data is a file.

15. The image reader according to claim 1, wherein
the data mover causes a user to select a moving destination in a batch or individually.

16. The image reader according to claim 1, wherein
the capacity comparison section notifies a user of a difference between the size of the image data of the document and the storage capacity of the external storage medium as a capacity in order to store the image data in the external storage medium.

17. An image reading method for an image reader that reads image data of a document by scan processing, the image reading method comprising:

reading the document;

detecting storage capacity capable of storing information in an external storage medium that is connected to the image reader at a time of reading the document;

comparing a size of the image data acquired in the scan processing of the image data with the storage capacity of the external storage medium;

extracting data to be moved to a different storage medium from data that has been stored in the external storage medium;

moving the data that is extracted in the extracting the data to the different storage medium; and returning the data, that has been moved to the different storage medium, from the different storage medium to the external storage medium in a case where a free space is secured in the external storage medium by moving the image data of the document from the external storage medium after the data has been moved and the image data of the document has been stored in the external storage medium.

* * * * *